(12) United States Patent
Troesh

(10) Patent No.: US 12,343,767 B1
(45) Date of Patent: Jul. 1, 2025

(54) OPTICAL FIBER CLEANING SYSTEM AND APPARATUS

(71) Applicant: Lucas Troesh, Marshall, VA (US)

(72) Inventor: Lucas Troesh, Marshall, VA (US)

( * ) Notice: Subject to any disclaimer, the term of this patent is extended or adjusted under 35 U.S.C. 154(b) by 0 days.

(21) Appl. No.: 19/017,981

(22) Filed: Jan. 13, 2025

(51) Int. Cl.
| | |
|---|---|
| *B08B 1/40* | (2024.01) |
| *B08B 1/12* | (2024.01) |
| *B08B 1/14* | (2024.01) |
| *B08B 1/54* | (2024.01) |
| *B65D 1/02* | (2006.01) |
| *B65D 47/00* | (2006.01) |
| *G02B 6/25* | (2006.01) |

(52) U.S. Cl.
CPC ............... *B08B 1/40* (2024.01); *B08B 1/12* (2024.01); *B08B 1/14* (2024.01); *B08B 1/54* (2024.01); *B65D 1/0246* (2013.01); *B65D 47/00* (2013.01); *G02B 6/25* (2013.01); *B08B 2240/02* (2013.01)

(58) Field of Classification Search
CPC .... B08B 1/12; B08B 1/14; B08B 1/40; B08B 1/54; B08B 2240/02; B65D 1/0246; B65D 47/00; A46B 11/0055; A46B 2200/30
USPC ............................................... 401/188 R, 207
See application file for complete search history.

(56) References Cited

U.S. PATENT DOCUMENTS

| | | | |
|---|---|---|---|
| 5,125,980 A | 6/1992 | Schotter | |
| 6,006,768 A * | 12/1999 | Cox | ............... G02B 6/3849 134/198 |
| 6,854,152 B2 * | 2/2005 | Loder | ............... B08B 1/00 15/210.1 |
| 12,121,938 B2 | 10/2024 | Manko | |

* cited by examiner

*Primary Examiner* — Jennifer C Chiang
(74) *Attorney, Agent, or Firm* — Stanzione & Associates, PLLC; Patrick Stanzione

(57) ABSTRACT

An optical fiber cleaning system including a bottle to contain a liquid therein and a pump head adaptor threaded onto the bottle and including a straw extending from the bottom of the pump head adaptor to draw liquid from the bottle, a triangular shaped dispersion head connected to the straw to receive and disburse the liquid drawn through the straw when pushed downward against the liquid pump head; and an optical fiber cleaning apparatus formed in a V-shape to rest on the triangular shaped dispersion head and including fiber jaws sponges fixed thereto to receive liquid from the triangular shaped dispersion head when pressed down on the triangular shaped dispersion.

8 Claims, 4 Drawing Sheets

OPTICAL FIBER CLEANING SYSTEM AND APPARATUS

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71 (d).

BACKGROUND OF THE INVENTIVE CONCEPT

1. Field of the Invention

The present inventive concept is related to an optical fiber cleaning apparatus, and more particularly to an apparatus for removal of a residual coating (a fixative), dust, debris and other particulates from bare fiber optic cables before splicing the fiber optic cables.

2. DESCRIPTION OF THE RELATED ART

It is necessary for bare optical fibers to be completely clean before a splicing process takes place. Even the smallest dust particle can offset the optical fibers from a fiber groove in the fiber splicing machine and thus prevent the splicing machine from successfully splicing the optical fiber. Furthermore, optical fibers need to be cleaved to a specific length. This cleaving process occurs prior to splicing, but after the removal of the residual coating (fixative) of the optical fiber. The optical fibers also need to be dust free before a successful cleave can be performed. The current method to remove the residual coating (after stripping the majority of said coating with a manual or thermal stripper, depending on fiber type (ribbon or single fiber)) is to use a lint-free task wipe. This wipe is typically folded in half several times and is subsequently wetted/soaked with isopropanol or 99.9% isopropyl alcohol, using a pump top reservoir liquid dispensing bottle. A fiber optic technician will then delicately fold the wipe over the bare fiber, or ribbon of fibers, gently squeeze the wipe against the fibers, and "wipe" repeatedly, until the technician can visually confirm that the fiber/fibers are entirely free of fixative, dust, etc. This current method is cumbersome, risks breaking the extremely delicate fiber or fibers, and exposes the technicians' skin to strong alcohol solvents repeatedly throughout the splicing process. Other devices have been created to treat optical fibers, as described below.

U.S. Pat. No. 5,125,980 by Schotter describes an optical fiber cleaner that includes a chamber 34 within a housing. The chamber 34 includes a nozzle 40 connected to a supply 42 of a cleaning solvent and directs a spray 44 of a solvent onto a moving fiber 12 passing through the housing. Another nozzle 46 can be included within the housing to direct a pressurized air stream on the fiber 12 to dry the solvent and remove foreign particulate matter from the fiber 12. Another version has brushes 50,52 within the housing that the fiber moves against to aid in removing particulate matter from the fiber surface. This optical fiber cleaner is complex, requiring multiple parts within a housing, which must operate mechanically to clean an optical fiber.

U.S. Pat. No. 12,121,938 by Manko describes an apparatus for treating optical fibers, where the apparatus includes two pivotal base plates 1, which are connected to each other pivotally by hinge joints 2.1/2.2 which joint together in a comb-like fashion. The hinge joint is rotatably fixed by a screw connection 5. A spring 4 is arranged in the middle of the hinge joint to pivot the plates 1 relative to each other. Guide rails are arranged on the surface of the plates 1 to slide holding plates 3 therein. Then an insulating material 8 is applied adhesively on the surfaces of the holding plates 3 facing the interior of the apparatus. Then a cleaning cloth 10, used as a treatment surface, is arranged to be held against the holding plates 3 by clamp brackets 7. This system by Manko is very complex, requiring a substantial number of parts and arrangement to provide a treatment cloth 10 is position to treat optical fibers.

Accordingly, there is a need for an optical fiber cleaning apparatus that includes a minimum number of parts.

There is also a need for an optical fiber cleaning apparatus that removes the necessity to use disposable wipes to clean bare optical fibers, which are otherwise required to be purchased repeatedly.

There is also a need for an optical fiber cleaning apparatus that can be used with solvents while a user's hands do not come into contact with the solvent.

There is also a need for an optical fiber cleaning apparatus that can effectively grip and clean many optical fibers and then be easily cleaned to perform optical fiber cleaning on many more optical fibers.

There is also a need for an optical fiber cleaning apparatus that can be easily rewetted with a cleaning solvent when needed.

SUMMARY OF THE INVENTIVE CONCEPT

The present general inventive concept is related to an optical fiber cleaning apparatus. More particularly, but not exclusively, the present inventive concept is related to an apparatus for removal of a residual coating (a fixative), dust, debris and other particulates from bare fiber optic cables before splicing the fiber optic cables.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an optical fiber cleaning system, including: a bottle with a threaded neck extending from one end thereof; a liquid pump head adaptor including an internally threaded section extending from a bottom thereof to thread onto the threaded neck of the bottle and a straw extending from the bottom thereof to draw liquid from the bottle; a triangular shaped dispersion head connected to the straw at a top of the liquid pump head to receive and disburse the liquid drawn through the straw when pushed downward against the liquid pump head; and a V-shaped fiber jaws grip including fiber jaws sponges fixed to the V-shaped fiber jaws grip and configured to rest on a top of the triangular shaped dispersion head, to receive the liquid from the triangular shaped dispersion head when pressed down on the triangular shaped dispersion head and to flex inward when pinched such that the fiber jaws sponges can enclose optical fibers therebetween to clean residual fixatives, dust, debris, etc., from the optical fiber strands.

In an example embodiment, the V-shaped fiber jaws grip is formed of a thermoplastic polyurethane material.

In another example embodiment, the optical fiber cleaning system may further include: a brush mounting unit including a first ring attached around a circumference of the bottle and a second ring attached to the first ring, the second ring configured to receive and retain a non-static brush therein; and a non-static brush configured to brush off any residual fixative, dust, debris, etc., accumulated on the fiber jaws sponges.

In another example embodiment, the liquid pump head adaptor may include a pump spring surrounding the straw and configured to return the triangular shaped dispersion head connected and straw back to a resting state when the pushing force is released from the triangular shaped dispersion head.

In still another example embodiment, the V-shaped fiber jaws grip may include: a pair of extension legs; a hinge connected to a first end of each of pair of extension legs to enable the two extension legs to pivot towards each other when pressed together; and a spring configured to push the pair of extension legs back to the V-shape when the pressing force is released.

The foregoing and/or other features and utilities of the present general inventive concept may also be achieved by providing a flexible V-shaped optical fiber cleaning apparatus, including: a pair of extensions forming the V-shape, each extension including a sponge fixed along an inner surface thereof and configured to rest on a top of a triangular shaped liquid dispersion head, to receive liquid from the triangular shaped dispersion head when pressed down on the triangular shaped dispersion head and to flex toward each other when pinched such that the sponges will enclose optical fibers therebetween to clean residual fixatives, dust, debris, etc., therefrom.

In an example embodiment, the pair of extensions forming the V-shape are formed of a thermoplastic polyurethane material.

In another example embodiment, the flexible V-shaped optical fiber cleaning apparatus may further include: a hinge connected to a first end of each of the pair of extension to enable the two extensions to pivot towards each other when pressed together; and a spring configured to push the pair of extensions back to the V-shape when the pressing force is released.

Additional features and utilities of the present general inventive concept will be set forth in part in the description which follows and, in part, will be obvious from the description, or may be learned by practice of the general inventive concept.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
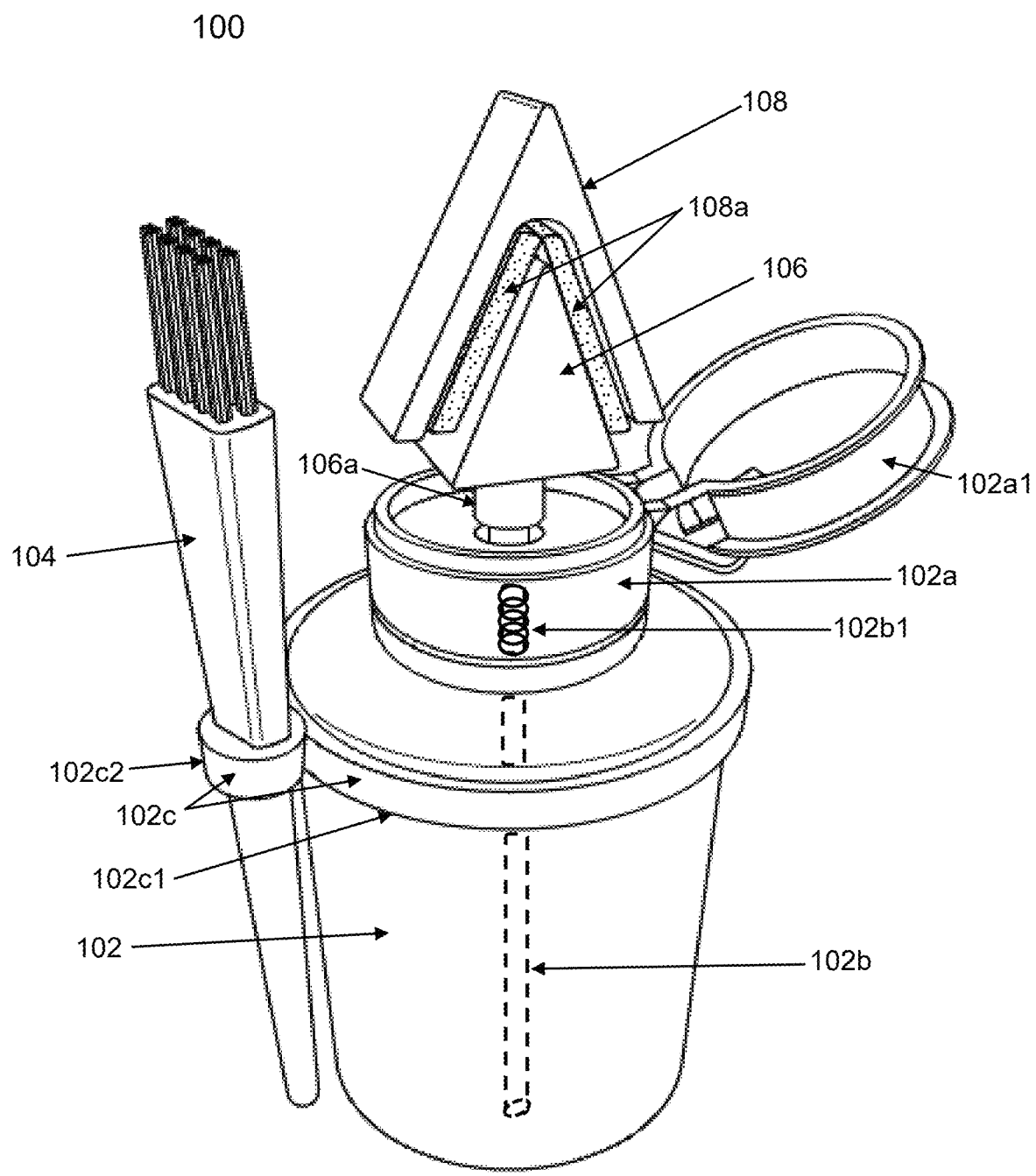
FIG. 1 illustrates a perspective view of an optical fiber cleaning system, according to an example embodiment of the present inventive concept.

The drawings illustrate a few example embodiments of the present inventive concept and are not to be considered limiting in its scope, as the overall inventive concept may admit to other equally effective embodiments.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to the intention of the lexicographer, case precedents, or the appearance of new technologies. Also, some terms may be arbitrarily selected by the inventors, and in this case, the meaning of the selected terms will be described in detail in the detailed description herein. Thus, the terms used herein should be defined based on the generally defined meaning of the terms together with the description throughout this specification.

Hereinafter, one or more exemplary embodiments of the present general inventive concept will be described in detail with reference to accompanying drawings.

Example embodiments of the present general inventive concept are directed to an optical fiber cleaning apparatus, and more particularly to an optical fiber cleaning apparatus for removal of a residual coating (a fixative), dust, debris and other particulates from bare fiber optic cables before splicing the fiber optic cables.

FIG. 1 illustrates a perspective view of an optical fiber cleaning system 100, according to an example embodiment of the present inventive concept. Referring to FIG. 1, the optical fiber cleaning system 100 can include a liquid (or solvent) retaining bottle 102. The solvent retaining bottle 102 can include an open top portion (not illustrated) with a threaded neck to receive a threaded cap 102a thereon to retain the solvent from escaping from the bottle 102. The threaded cap 102*a* can include a pivotal top portion 102*a*1 that snaps onto the top portion of the cap 102*a* and can be unsnapped and pivoted away from the top portion of the cap 102*a* to access the solvent contained in the bottle 102. Attached to the threaded cap 102*a* can be a straw 102*b* which extends into the bottle 102 when the threaded cap 102*a* is threaded onto the bottle 102. The threaded cap 102*a* can include a liquid pump head adaptor, including a pump spring 102*b*1 disposed within the cap 102*a*, such that when the straw 102*b* is pushed downward to draw solvent up through the straw 102*b* the pump spring 102*b*1 will cause an opposite force to return the straw 102*b* back up to its original position.

Surrounding an upper portion of the solvent bottle 102 can be disposed a brush mount 102*c*. The brush mount 102*c* can include a first ring 102*c*1 that is configured to tightly encircle the upper outer portion of the solvent bottle 102 and a second ring 102*c*2 connected to the first ring 102*c*1 to receive and retain a brush 104 therein. The rings 102*c*1 and 102*c*2 can be aligned such that their central axes are in parallel. The brush 104 can then be inserted into the second ring 102*c*2 and be in an upright position adjacent to the solvent bottle 102. The brush 104 is preferably a non-static brush 104 to avoid retaining static thereon, which can negatively affect an optical fiber.

A liquid dispersal head 106 can be shaped in a triangle and can include a hollow cylindrical extension 106*a* extending from a bottom portion of the dispersion head 106. The hollow cylindrical extension 106*a* is configured to fit over an end of the straw 102*b* to receive liquid therethrough from the solvent bottle 102 when the dispersion head 106 is pushed downward, which will cause the straw 102*b* to be pushed downward into the solvent bottle 102. The dispersion head 106 is formed with channels therethrough to disperse the received solvent, as described in more detail with respect to FIG. 2.

A fiber jaws grip 108 is configured to have two extensions that form a V-shape. The V-shape is configured to rest on top of the triangular dispersion head 106 and to act as an optical fiber cleaning apparatus, as described in more detail below. The fiber jaws grip 108 can include a fiber jaws sponge 108*a* fixed at an inner side of each of the two extensions of the V-shaped body. The fiber jaws grip 108 is formed of a material that is flexible such that when two fingers of a user squeeze or pinch the V-shaped extensions toward each other the two extensions of the fiber jaws grip 108 flex towards each other and cause the fiber jaws sponges 108*a*, fixed to a respective one of the extensions, to come together to firmly enclose and grip a bare optical fiber strand or strands placed therebetween. The fiber jaws sponges 108*a* fixed to each of the respective extensions of the fiber jaws grip 108 are configured to absorb solvent from the dispersion head 106. The dispersion head 106 is configured to evenly distribute solvent onto (and hence into) the fiber jaws sponge 108*a* of the fiber jaws grip 108 and to also act as a rest for the fiber jaws grip 108 during use. The dispersion head 106 can be made of a hard plastic or a thermoplastic polyurethane material with channels formed therein to disperse the solvent, as described in more detail below with reference to FIG. 2.

Figure 2:
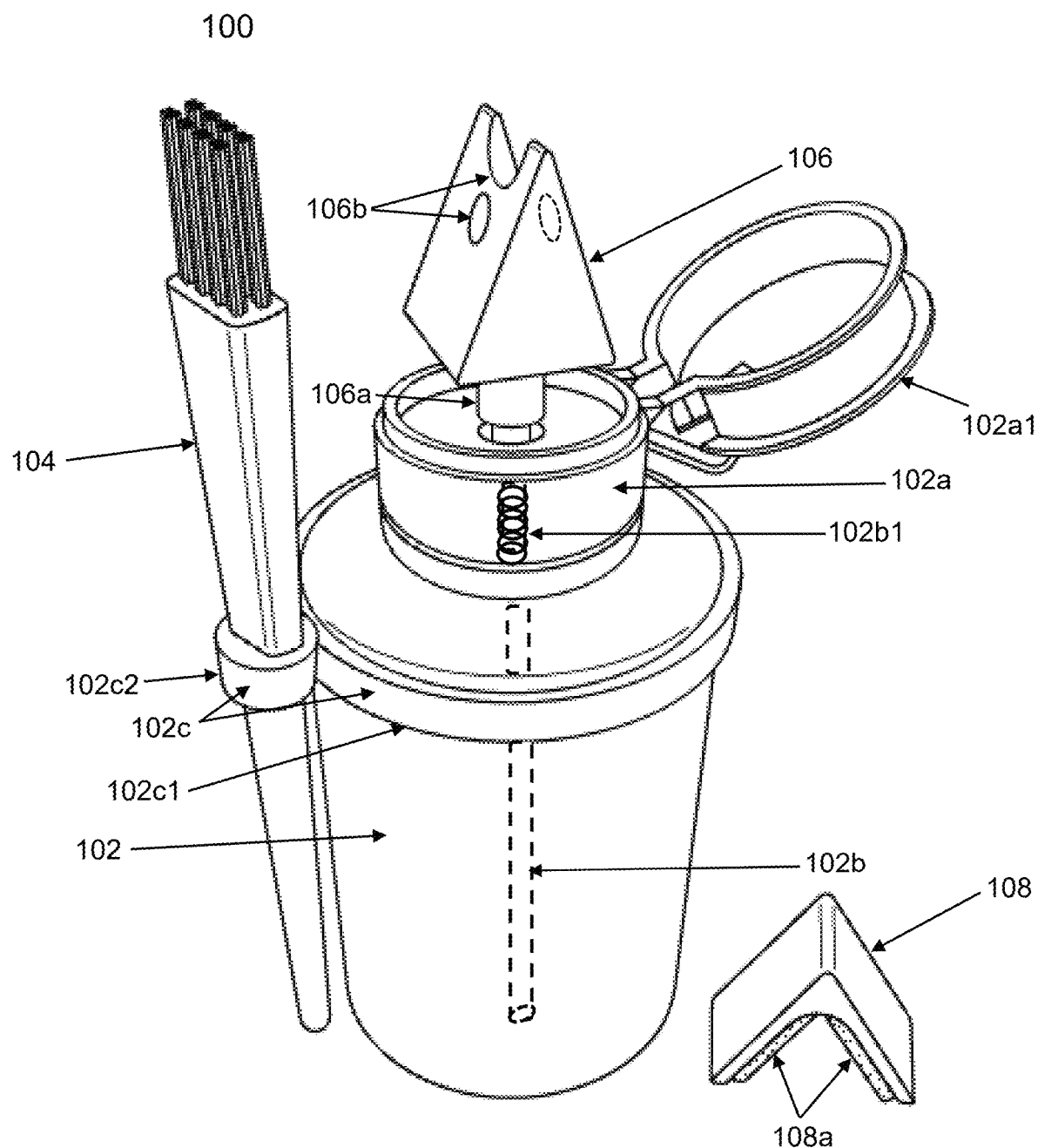
FIG. 2 illustrates another perspective view of the optical fiber cleaning system according to the example embodiment of FIG. 1.

FIG. 2 illustrates another perspective view of the optical fiber cleaning system according to the example embodiment of FIG. 1, with the fiber jaws grip 108 removed from resting on the triangular dispersion head 106. Referring to FIG. 2, the dispersion head 106 can include countersunk holes 106*b* formed therein and channels to disperse the solvent from the solvent bottle 102 to the countersunk holes 106*b*. The countersunk holes 106*b* are provided to allow for a larger area of liquid/solvent distribution and to relieve fluid pressure to prevent solvent from squirting out from between the two extensions of the dispersion head 106. According to an example embodiment there can be three holes 106*b* formed in the dispersion head 106, one on top and one on either side thereof. Alternatively, there can be more or less holes 106*b* formed in the dispersion head 106, without departing from the spirit and scope of the overall inventive concept. In FIG. 2 the fiber jaws grip 108 is not resting on the dispersion head 106 in order to illustrate the countersunk holes 106*b* formed in the dispersion head 106.

Figure 3:
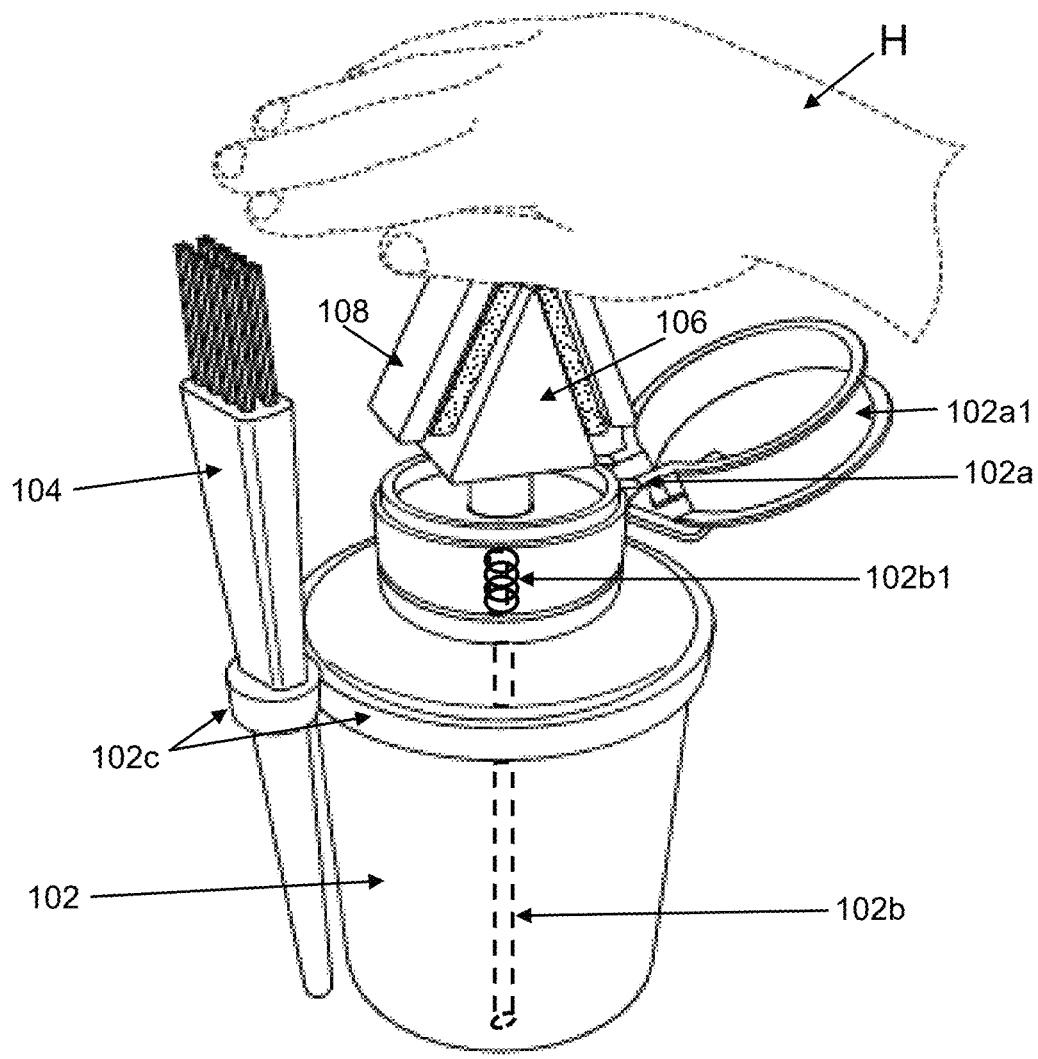
FIG. 3 illustrates another perspective view of the optical fiber cleaning system according to the example embodiment of FIG. 1 in an operational state.

FIG. 3 illustrates another perspective view of the optical fiber cleaning system according to the example embodiment of FIG. 1, in an operational state. Referring to FIG. 3, a user can easily wet the fiber jaws sponges 108*a* by lightly pressing the fiber jaws grip 108 down over the dispersion head 106 so that solvent will be drawn up through the straw 102*b*, through the dispersion head 106 channels and onto (and into) the fiber jaws sponges 108*a*. At this point the fiber jaws sponges 108*a*, fixed to respective extensions of the fiber jaws grip 108, will be sufficiently wet with solvent and ready to be pinched to enclose the one or more bare optical fiber strands to remove residual fixative (typically acrylate polymer coating), dust, debris, etc., from the optical fiber strands. This process of removing residual fixative, dust, debris, etc., from the bare optical fiber strands is generally performed prior to splicing the optic fiber strands. At some point the fiber jaws sponges 108*a* will accumulate residual fixative, dust, debris, etc., thereon from the bare optical fiber strands. When it is desired to clean the fiber jaws sponges 108*a* the non-static brush 104 can be used to brush the fiber jaws sponges 108*a* clean for further use, thus enabling a long lifespan of the fiber jaws sponges 108*a*.

The fiber jaws grip 108 is generally used after a thermal stripper is used to remove the bulk of a coating from the optical fibers to reveal the bare optical fibers prior to splicing the bare optical fiber(s). The optical fiber(s) can remain in a chuck that is commonly used for splicing the optical fibers, at which point the fiber jaws grip 108 can be squeezed to enclose the fiber jaws sponges 108*a* over the bare optical fiber(s) and wipe off any remainder of the residual coating, dust, debris, etc., from the bare optical fiber(s).

The fiber jaws grip 108 can be formed of a thermoplastic polyurethane material that is sufficiently flexible to pinch the two extensions of the V-shape together to enable the fiber jaws sponges 108*a* to enclose optical fiber(s) to clean any residual coating, dust, debris, etc., from the bare optical fiber(s). However, the fiber jaws grip 108 can be formed of other equivalent materials that will perform to the intended purposes, as described herein.

The brush 104 and the liquid pump head adaptor 102*a* can also be formed of a thermoplastic polyurethane material. Alternatively, the brush 104 and the liquid pump head adaptor 102*a* can be formed of other similar materials, such as a plastic, or other similar material(s) which will perform the intended purposes, as described herein.

Figure 4:
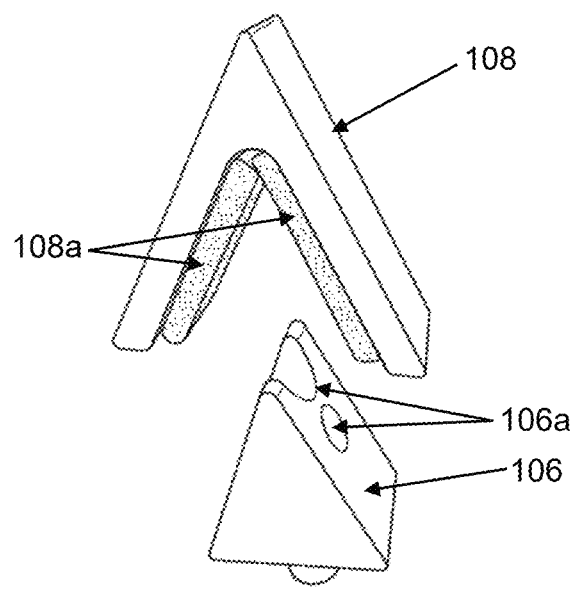
FIG. 4 illustrates a plan view of a fiber jaws grip and a liquid dispersal head combination, according to an example embodiment of the present inventive concept.

FIG. 4 illustrates how the fiber jaws grip 108 fits securely over the dispersion head 106 to enable the fiber jaws sponges 108*a* to receive solvent from the countersunk holes 106*b* of the dispersion head 106 or to rest on the dispersion head 106 until needed.

Figure 5:
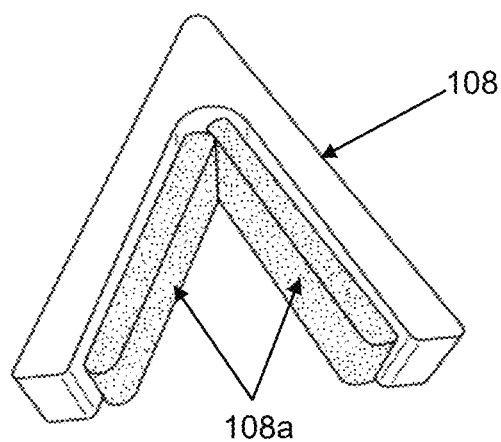
FIG. 5 illustrates an expanded perspective view of the fiber jaws grip according to the example embodiment of FIG. 4.

FIG. 5 illustrates an expanded perspective view of the fiber jaws grip 108 and fiber jaws sponges 108*a*. It is to be noted that the fiber jaws grip 108 can also be formed as two separate extensions connected to each other at one end via a hinge and spring combination, which will also enable the two extensions of the fiber jaws grip 108 to be pressed towards each other to enclose bare optical fiber strands between the respective fiber jaws sponges 108a and then spring back to its original V-shaped position.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An optical fiber cleaning system, comprising:
   a bottle with a threaded neck extending from one end thereof;
   a liquid pump head adaptor including an internally threaded section extending from a bottom thereof to thread onto the threaded neck of the bottle and a straw extending from the bottom thereof to draw liquid from the bottle;
   a triangular shaped dispersion head connected to the straw at a top of the liquid pump head to receive and disburse the liquid drawn through the straw when pushed downward against the liquid pump head; and
   a V-shaped fiber jaws grip including fiber jaws sponges fixed to the V-shaped fiber jaws grip and configured to rest on a top of the triangular shaped dispersion head, to receive the liquid from the triangular shaped dispersion head when pressed down on the triangular shaped dispersion head and to flex inward when pinched such that the fiber jaws sponges can enclose optical fibers therebetween to clean residual fixatives, dust, debris, etc., from the optical fiber strands.

2. The optical fiber cleaning system according to claim 1, wherein the V-shaped fiber jaws grip is formed of a thermoplastic polyurethane material.

3. The optical fiber cleaning system according to claim 1, further comprising:
   a brush mounting unit including a first ring attached around a circumference of the bottle and a second ring attached to the first ring, the second ring configured to receive and retain a non-static brush therein; and
   a non-static brush configured to brush off any residual fixative, dust, debris, etc., accumulated on the fiber jaws sponges.

4. The optical fiber cleaning system according to claim 1, wherein the liquid pump head adaptor includes a pump spring surrounding the straw and configured to return the triangular shaped dispersion head connected and straw back to a resting state when the pushing force is released from the triangular shaped dispersion head.

5. The optical fiber cleaning system according to claim 1, wherein the V-shaped fiber jaws grip includes:
   a pair of extension legs;
   a hinge connected to a first end of each of pair of extension legs to enable the two extension legs to pivot towards each other when pressed together; and
   a spring configured to push the pair of extension legs back to the V-shape when the pressing force is released.

6. A flexible V-shaped optical fiber cleaning apparatus, comprising:
   a pair of extensions forming the V-shape, each extension including a sponge fixed along an inner surface thereof and configured to rest on a top of a triangular shaped liquid dispersion head, to receive liquid from the triangular shaped dispersion head when pressed down on the triangular shaped dispersion head and to flex toward each other when pinched such that the sponges will enclose optical fibers therebetween to clean residual fixatives, dust, debris, etc., therefrom.

7. The flexible V-shaped optical fiber cleaning apparatus according to claim 6, wherein the pair of extensions forming the V-shape are formed of a thermoplastic polyurethane material.

8. The flexible V-shaped optical fiber cleaning apparatus according to claim 6, further comprising:
   a hinge connected to a first end of each of the pair of extension to enable the two extensions to pivot towards each other when pressed together; and
   a spring configured to push the pair of extensions back to the V-shape when the pressing force is released.

* * * * *